3,301,572
SUSPENSIONS FOR THE FRONT STEERABLE
WHEELS OF A VEHICLE
Geoffrey Edward Ernest Tapp, Farnham, and Joseph Davey, Crookham, England, assignors to County Commercial Cars Limited, Aldershot, Hampshire, England, a British company
Filed Jan. 7, 1965, Ser. No. 423,934
Claims priority, application Great Britain, Feb. 24, 1964, 8,278/64
14 Claims. (Cl. 280—95)

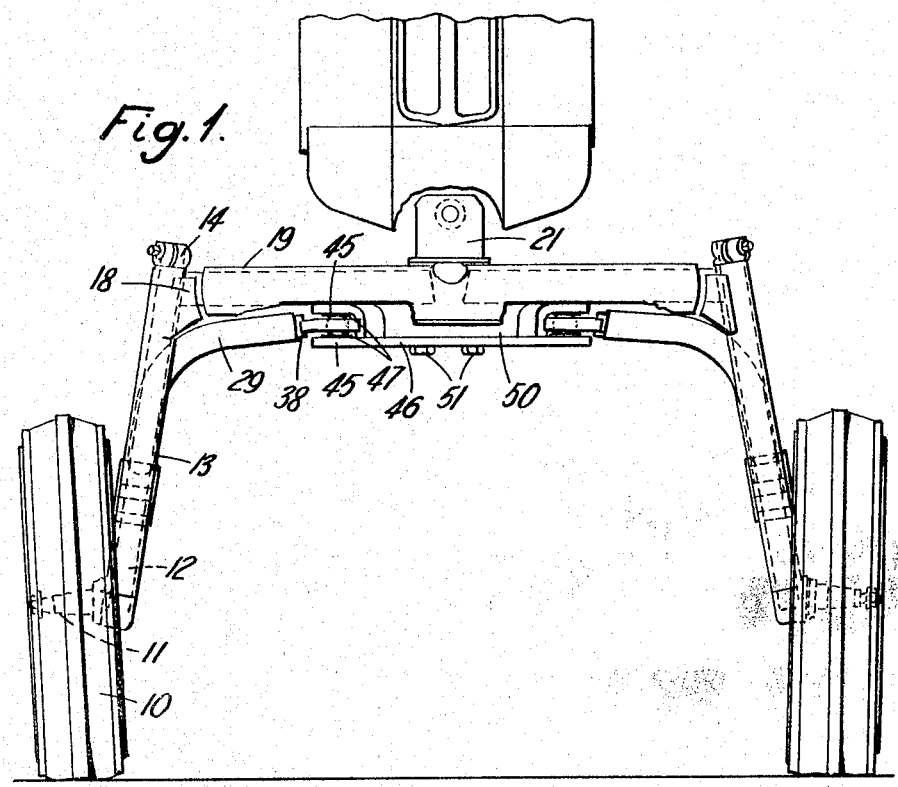
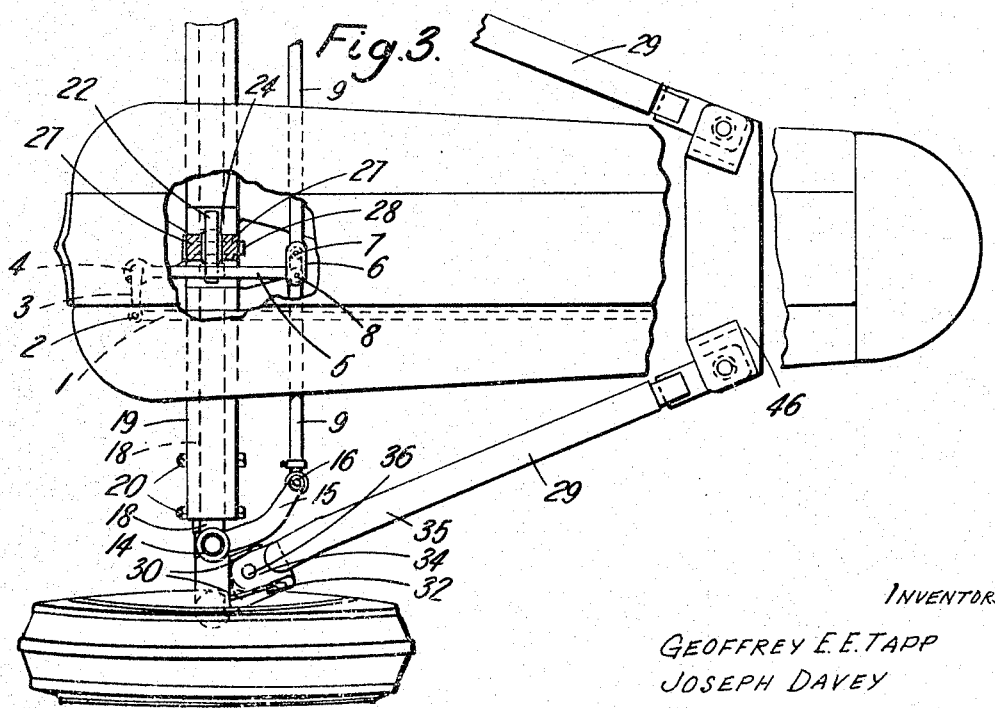

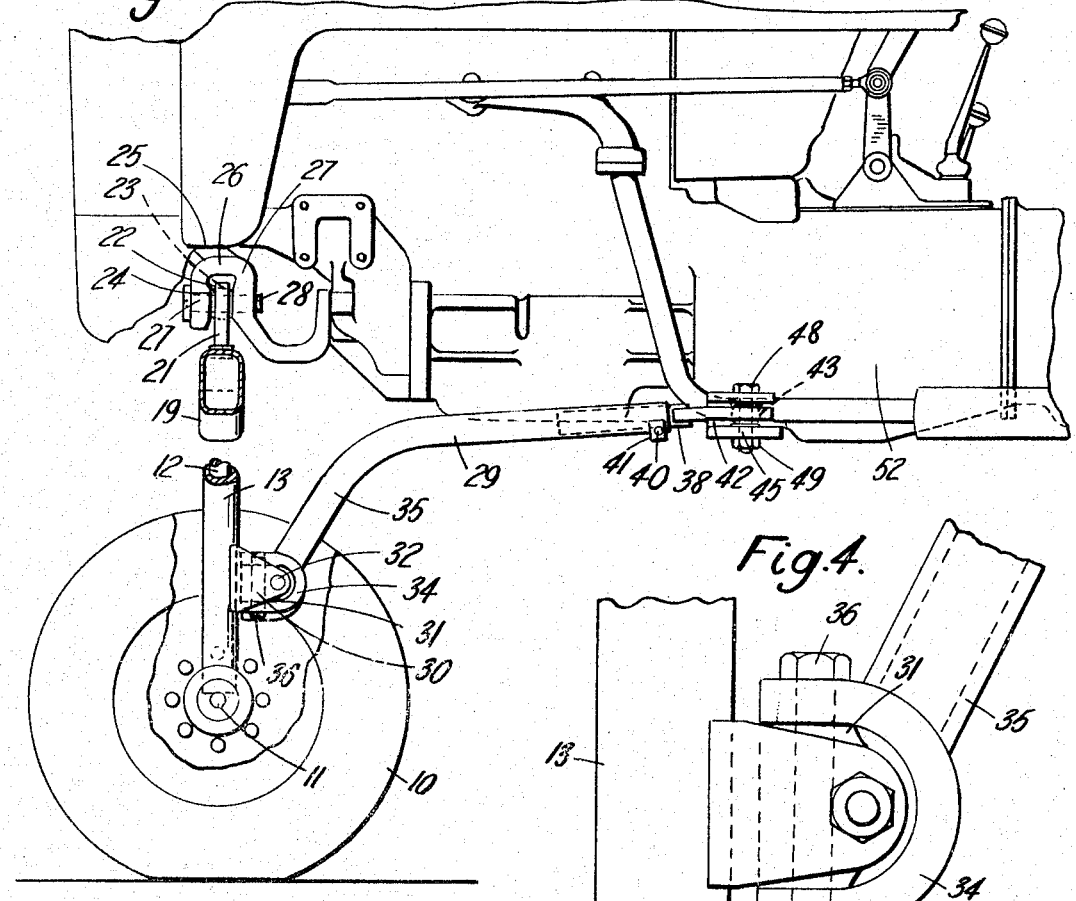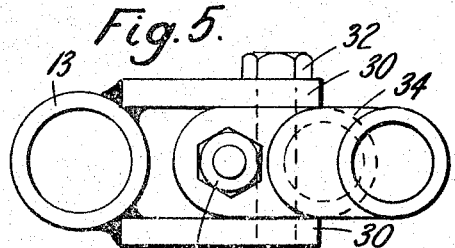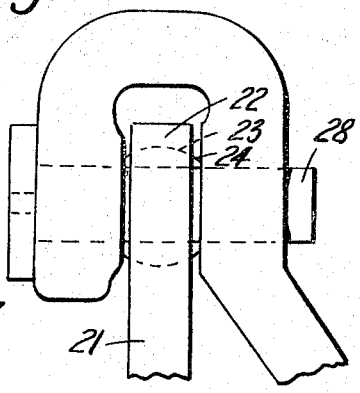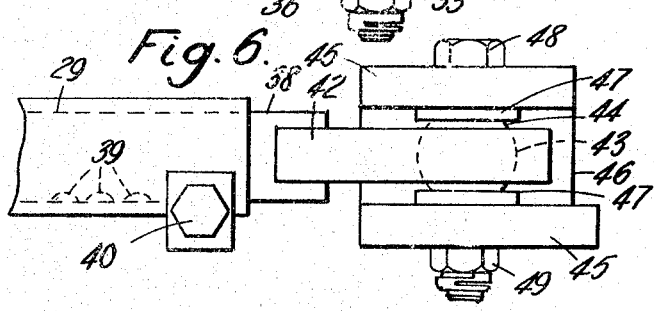

This invention relates to a suspension for the front steerable wheels of a vehicle and particularly for a tractor, in which the engine casing, gear box casing, and rear wheel axle casings are secured together as a unit.

Various suspensions have been already designed for the purpose of providing a high clearance between the main structure of the vehicle and the ground.

In a conventional wheeled tractor the front axle comprises a cross member or axle beam which may either be of a fixed length or is adjustable in length and is pivoted at its centre to a fixed part of the vehicle so as to rock both about a fore and aft axis. In such an arrangement each end of the axle has been provided with an upstanding tubular member in which a king post rotates with the steering of the vehicle. The lower end of each king post is provided with a stub axle for each road wheel, and steering gear is associated with the king posts.

In such an arrangement it is usual for the fore and aft loads on the wheels to be taken either by making the centre of the pivot of the axis beam of a double trunnion form or by some form of radius rod from the axle beam or from tubes supporting the king post and extending rearwardly to anchorage points on the vehicle structure.

In the case of a high clearance tractor it is not practicable to use a double trunnion for connecting the axle beam to a fixed part of the tractor, as due to the considerable length of the tubular members which support the axle posts the distance of the wheel centres from the trunnion arrangement is such that a very high torsional load would be placed on the axle beam. It is therefore necessary in the case of high clearance tractors to incorporate some form of radius rod attached to the tubular members as close as possible to the wheels and extending rearwards.

For the ideal geometry of the layout, the two radius rods should meet at their rearward extremities and should pivot together about a single axis, the axis being coincident with that about which the axle beam is able to swing. However, in practice it is difficult to arrange this since bringing the rearward pivot of the radius rods to a single point necessitates lowering them beneath the engine gear box unit, and thereby intruding into the clearance space.

The two rear extremities of the radius rods therefore have to be separated and brought to a position on either side of the engine transmission unit. This involves a geometrical inaccuracy if the radius rods are rigidly attached to the king pin tubes and also if the axle pivots about a simple trunnion joint.

Such inaccuracies are acceptable in the case where the radius rods are attached directly to the axle beam, when the resulting inaccuracies are so slight as to be negligible. However, with a high clearance tractor as previously stated the forward mounting of the radius rods should be placed as close as possible to the wheel centres and in this position they are spaced a considerable distance downwardly from the axle beam but this would again result in geometric inaccuracies.

The present invention provides for the correct geometry in the following manner.

According to this invention a suspension for the front steerable wheels of a vehicle comprises an axle beam mounted at its centre by a universal joint on a fixed part of the vehicle structure, tubular members conected to and extending downwardly from the ends of the axle beam, king posts rotatable in said tubular members and having stub axles at their lower extremities for supporting the road wheels, a steering transmission associated with the king posts, radius rods secured at one end by universal joints to the lower ends of said tubular members, which radius rods converge as they extend away from the tubular members and are connected at their other ends by universal joints to a fixed part of the vehicle structure, and the lengths of which king posts and tubular members are selected in accordance with the clearance required between the lower part of the vehicle structure and the ground.

Any of said universal joints may comprise either two pivotal connections with their axes of pivoting arranged at right angles to one another as in a Hookes joint and in certain instances a ball and socket joint, or may comprise resilient material secured between the parts to be connected together for example rubber or rubber-like plastics may be bonded to said parts.

Means may be provided for varying the effective length of the axis beam whereby the track of the road wheels may be varied, and means are also provided for varying the effective length of the radius rods so as to accommodate for difference in length of the axle beam.

The upper end of each tubular member may have fixed thereto laterally extending shanks and means are provided for clamping said shanks in different positions along the length of the axle beam whereby the effective length of the axle beam may be varied.

One part of each of those universal joints by which a radius rod is connected to a fixed part of the vehicle, may be provided with means for securing it to the radius rod at different positions along the length of the rod, whereby the effective length of the rod may be varied. In such an arrangement each said radius rod may be tubular and said part of the universal joint comprise a plug which is adjustably secured within the end of the tubular radius rod.

In one construction according to the invention a Hooke's type joint is employed for connecting one end of each radius rod to a tubular member accommodating a king post.

In the case where the invention is applied to a tractor of the kind in which the engine casing and gear box casing and rear axle casing are secured together to form a unit, the said unit at the forward lower part thereof has attached thereto a bracket or the like which supports one part of the universal joint at the centre of the aforesaid axle beam, and the universal joints for the rear ends of the radius rods may be mounted on a cross member secured to the underside of said units, for example, to the underside of the gear box casing.

Each radius rod may extend upwardly in a curved manner as it extends rearwardly from the universal joint which secures it to a tubular member carrying the king post terminates in a strength portion at a small angle to the horizontal where it is connected to a part of the universal joint which secures it to the cross member fixed to the underside of the unit.

The following is a description of the invention as applied to a high clearance tractor reference being made to the drawings accompanying the provisional specification in which:

FIGURE 1 is a diagrammatic view of the front of the tractor;

FIGURE 2 is a view looking from the right of FIGURE 1;

FIGURE 3 is a plan view of the arrangement shown in FIGURE 2;

FIGURE 4 is an enlarged view of part of FIGURE 2 showing the joint between a radius rod and a tubular member which supports a king post;

FIGURE 5 is a plan view of the joint shown in FIGURE 4;

FIGURE 6 is an enlarged view of that part of FIGURE 1 showing the joint between the rear end of a track rod and a cross member attached to the gear box casing of the vehicle; and FIGURE 7 is an enlarged view of that part of FIGURE 2 illustrating the joint between the axle beam and a structural member of the tractor.

As best seen in FIGURE 1 each steerable front wheel 10 is rotatable on the usual stub shaft 11, and the stub shaft is fixed to a king post 12. Each king post 12 extends upwardly through a tubular bearing member 13 and an upper end of each king post projects from the upper end of the tubular member 13 and has fixed to it a boss 14 from which extends a lever arm 15 (FIGURE 3). Each lever arm is pivotally connected at 16 to a cross rod 9. The upper of the two rods 9 as seen in FIGURE 3 is enlarged at 6 and overlaps the end of the other rod which end is pivoted at 7 to that end of the enlargement near where it joins the rod. The other end of the enlargement is pivoted at 8 to the end of one arm 5 of a bell crank lever. The bell crank lever is pivoted at 4 to a fixed part of the tractor. The other arm 3 of the bell crank lever is pivoted at 2 to a part 1 of a steering transmission. Each tubular member 13 has secured to its upper end a laterally extending shank 18 (FIGURE 1) which is slidably adjustable in the hollow end of an axle beam 19 and is provided with a number of holes therein which are selectively engageable by bolts 20 (see FIGURE 3) which extend through holes in the axle beam, whereby the two hollow members supporting the king posts may be spaced at different distances apart and the track of the front wheels may be varied.

Fixed to the centre of the axle beam is an upwardly extending lug 21 (FIGURES 1 and 7). An eye 22 (FIGURE 7) at the upper end of the lug has an internal part spherical surface 23 engageable with an external spherical surface on a bush 24.

A structural member 25 (FIGURE 2) of the tractor is formed, at the centre thereof, with an inverted U-shaped socket 26 the limbs 27 of which straddle the eye 22 and has holes therein through which extends a pivot pin 28 which also extends through the bush 24. By these means a universal joint is provided between the centre of the axle beam 19 and the structural member 25 of the vehicle, permitting the beam to swing about a fore and aft axis and about a horizontal transverse axis. Each tubular member 13 supporting a king post 12 is connected by a universal joint (referred to later) to the forward end of a radius rod 29, the rearward end of which is connected by a universal joint also referred to later to a part 46 attached to the body of the tractor.

The latter universal joint comprises two rearwardly extending lugs 30 welded to the tubular member 13 near the lower end thereof so as to be spaced apart side by side and which straddle a block 31 to which they are pivotally secured by a pivot bolt 32 held in position by a nut 33 (FIGURE 5).

Two opposite sides of the block 31 are straddled by the arms of a U-piece 34 fixed to a downwardly extending portion 35 of the radius rod and which arms of the U-piece are pivotally attached to the block 31 by a pivot bolt 36 held in position by a nut 37 (FIGURE 4), whereby a Hooke's type joint is provided between the tubular member 13 and the part 35 of the radius rod 29.

The rear end of each track rod 29 is tubular in character and the rear end thereof has slidably mounted in it a plug 38 formed on one side thereof with a number of transverse grooves 39 (FIGURE 6) which are selectively engageable by the shank of a bolt 40 extending through a thickened portion 41 of the radius rod so as to intersect the bore thereof. Thus the effective length of each radius rod may be varied.

The end of each plug 38 has fixed to it a rectangular section shank 42 (FIGURE 6) the extremity of which is formed with an eye having a part spherical internal surface 43, which encircles a part spherical member 44. Each spherical member is disposed between two limbs 45 of a fork formed on a cross member 46 (FIGURES 1 and 3) secured to the underside of the gear box casing 49. The part spherical member has flat side faces and washers 47 are disposed between these side faces and the inner faces of the limbs of the fork. A clamping bolt 48 (FIGURE 6) extends through holes in the limbs washers and part spherical member and is secured in position by a clamping nut 49. The centre of the cross member 46 is bolted to the underside of the gear box casing 50 of the tractor by bolts 51.

The various universal joints referred to above might be replaced by resilient joints. For example the universal joint between the part 36 of each radius rod and the tubular member 13 might comprise inner and outer steel sleeves between which is bonded a rubber bush. The outer sleeve is a push fit into a hollow boss at the lower end of the downwardly extending portion 35 and the inner sleeve is clamped between the lugs 30 on the tubular member 13, by the bolt 36 which passes through the inner sleeve. Also a rubber sleeve might be bonded between said eye 22 and pin 28 (FIGURE 7) or again a rubber sleeve might be bonded or between the wall of the hole in the shank 42 and a cylindrical surface on the bolt 48 (FIGURE 6).

We claim:

1. A suspension for the front steerable wheels of a vehicle comprising an axle beam mounted at its centre by a universal joint on a fixed part of the vehicle structure, tubular members connected to and extending downwardly from the ends of the axle beam to a level below said universal joint, king posts rotatable in said tubular members and having stub axles at their lower extremities for supporting the road wheels, a steering transmission associated with the king posts, radius rods secured at one end by universal joints directly to the lower ends of said tubular members which universal joints are below the first said universal joint, which radius rods converge as they extend upwardly away from the lower ends of the tubular members and are connected at their other ends by universal joints to a fixed part of the vehicle structure, and the lengths of which king posts and tubular members are selected in accordance with the clearance required between the lower part of the vehicle structure and the ground.

2. A suspension according to claim 1 wherein said fixed part to which the radius rods are connected by universal joints comprises a cross member fixed to or formed on the underside of an engine gear box.

3. A suspension according to claim 1 wherein each of said universal joints comprises either two pivotal connections with their axes of pivoting arranged at right angles to one another.

4. A suspension according to claim 1 wherein means are provided for varying the effective length of the axle beam whereby the track of the road wheels may be varied, and means are also provided for varying the effective length of the radius rods so as to accommodate for difference in length of the axle beam.

5. A susspension according to claim 1 wherein the upper end of each tubular member has fixed thereto laterally extending shanks and means are provided for clamping said shanks in different positions along the length of the axle beam whereby the effective length of the axle beam may be varied.

6. A suspension according to claim 1 wherein one part of each of those universal joints by which a radius rod is connected to a fixed part of the vehicle is provided with means for securing it to the radius rod at different positions along the length of the rod, whereby the effective length of the rod may be varied.

7. A suspension according to claim 6 wherein each said radius rod is tubular and said part of the universal joint comprises a plug which is adjustably secured within the end of the tubular radius rod.

8. A suspension according to claim 7 wherein a Hookes type joint is employed for connecting one end of each radius rod to a tubular member accommodating a king post.

9. The combination with a tractor of the kind in which the engine casing and gear box and rear axle casing are secured together to form a unit, of a suspension according to claim 1 wherein the unit at the forward lower part thereof has attached thereto a bracket or the like which supports one part of the universal joint at the centre of the aforesaid axle beam and the universal joints for the rear ends of the radius rods are mounted on a cross member secured to the underside of said unit.

10. A combination according to claim 9 wherein said cross member is secured to the underside of the gear box casing.

11. A combination according to claim 9 wherein each radius rod extends upwardly from the universal joint which secured it to a tubular member carrying the king pin and terminates in a straight portion at a small angle to the horizontal where it is connected to a part of the universal joint which secures it to the cross member fixed to the underside of the unit.

12. A suspension according to claim 1 wherein each said universal joint comprises a ball and socket joint.

13. A suspension according to claim 1 wherein each said universal joint comprises resilient material secured between the parts to be connected together, which material includes rubber and rubber-like plastics bonded to said parts.

14. A suspension for the front steerable wheels of a motor vehicle having an engine gear box, which suspension comprises an axle beam mounted at its centre by a universal joint on a fixed part of the vehicle structure, means for varying the effective length of the axle beam whereby the track of road wheels may be varied, tubular members connected to and extending downwardly from the ends of the axle beam, king posts rotatable in said tubular members and having stub axles at their lower extremities for supporting the road wheels, a steering transmission associated with the king posts, radius rods secured at one end by universal joints to the lower ends of said tubular members, which radius rods converge as they extend away from the tubular members and are connected at their other ends by universal joints to a cross member connected to said engine gear box, and means for varying the length of said radius rods so as to accommodate differences in the lengths of the axle beam and the length of which king posts and tubular members are selected in accordance with the clearance required between the lower part of the vehicle structure and the ground.

References Cited by the Examiner

UNITED STATES PATENTS

| | | | |
|---|---|---|---|
| 2,247,725 | 7/1941 | Ferguson | 280—111 X |
| 2,528,277 | 10/1950 | Humes et al. | 280—93 |
| 2,819,909 | 1/1958 | Calundan | 280—95 |
| 2,874,972 | 2/1959 | Andersen | 280—80 |
| 2,911,229 | 11/1959 | Strehlow | 280—34 X |
| 3,006,429 | 10/1961 | Polhemus | 280—112 X |
| 3,083,982 | 4/1963 | De Jong | 280—112 |

KENNETH H. BETTS, *Primary Examiner.*